July 21, 1936.                A. S. RIGGS                2,047,984
ELECTRON TUBE CONTROL FOR REVERSIBLE MOTIVE MEANS
Filed Sept. 9, 1933          2 Sheets-Sheet 1
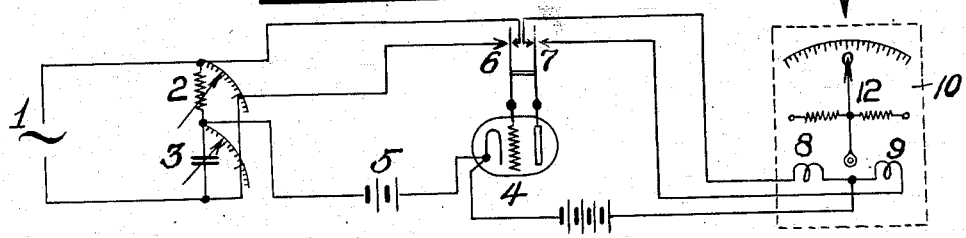
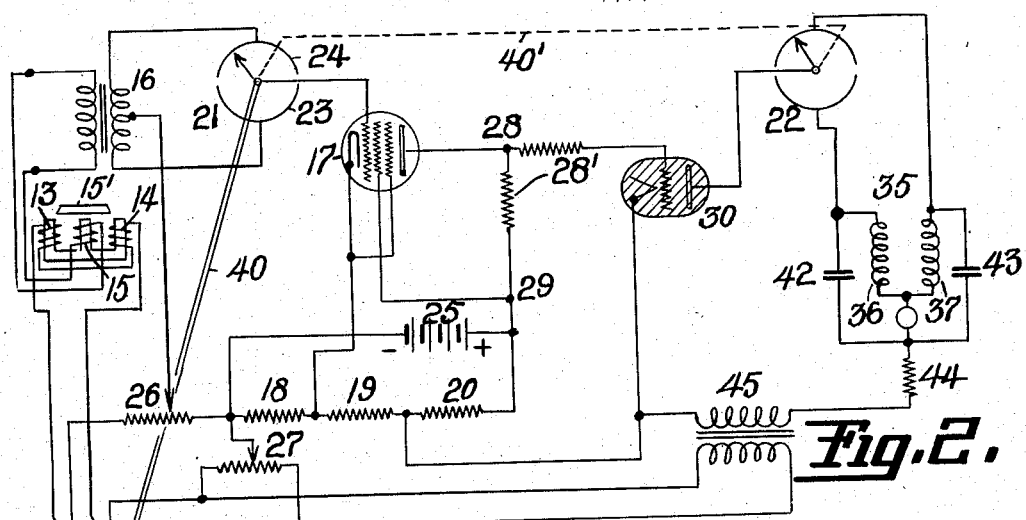
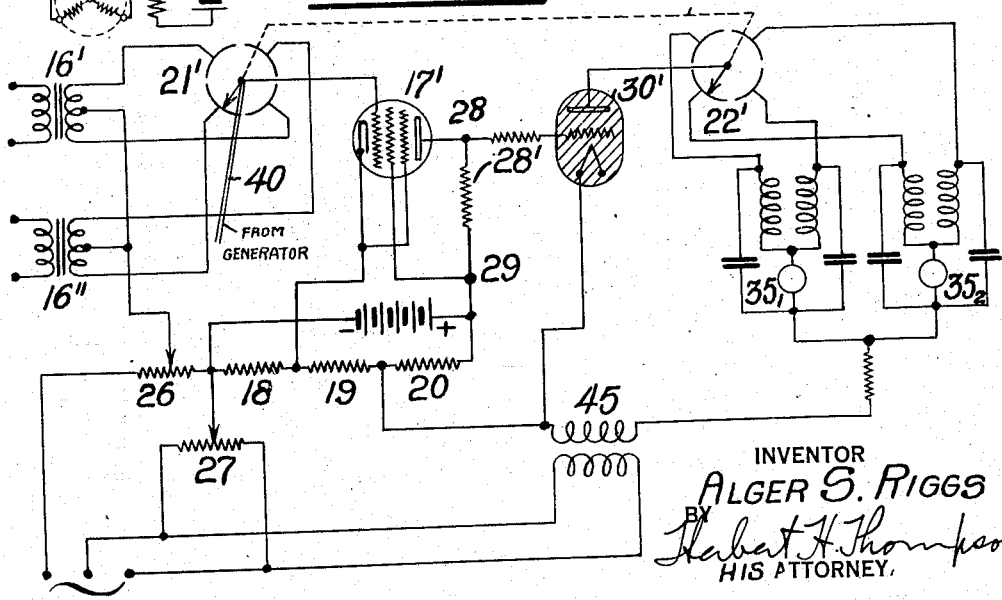
INVENTOR
ALGER S. RIGGS
BY
Herbert H. Thompson
HIS ATTORNEY

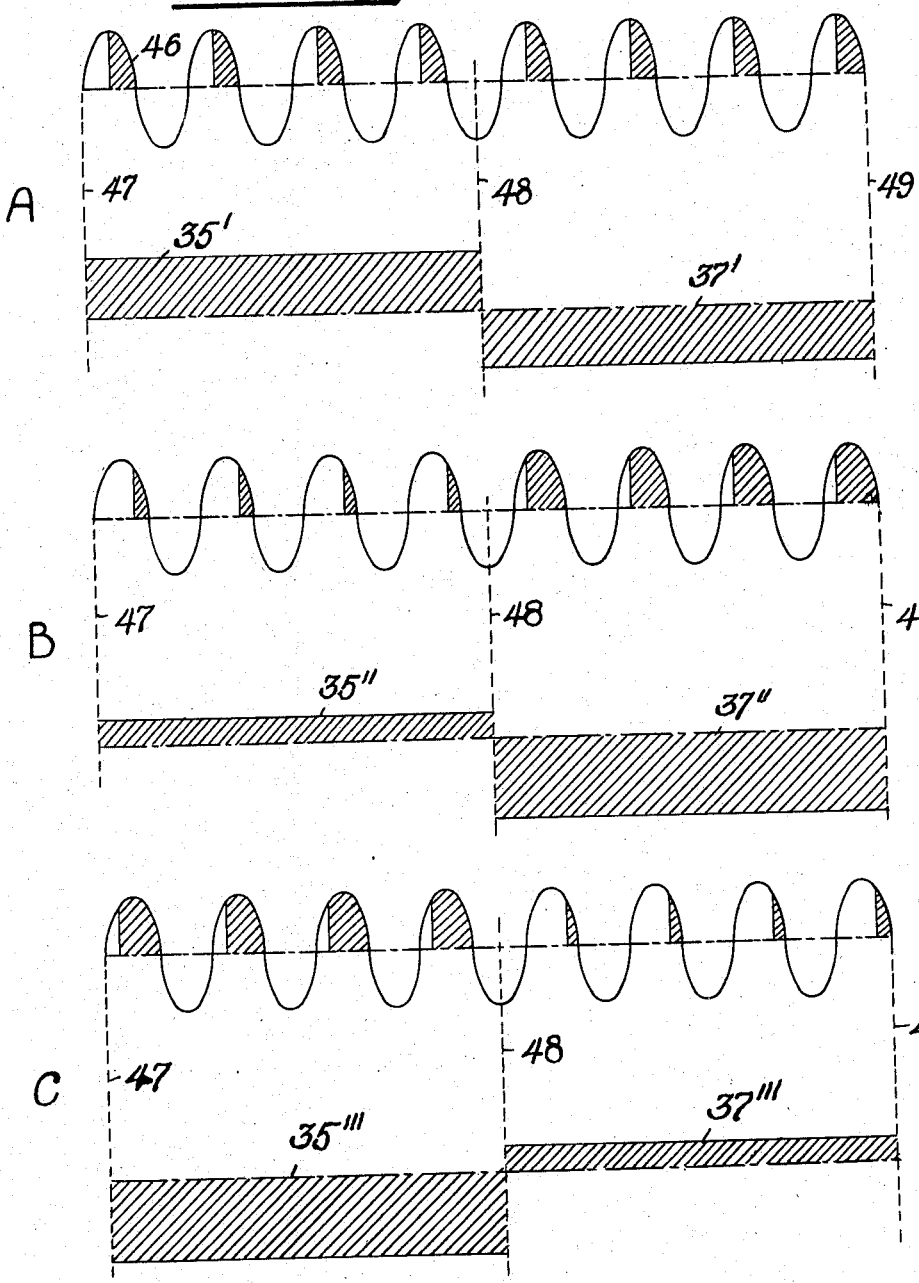

Patented July 21, 1936

2,047,984

UNITED STATES PATENT OFFICE 2,047,984

ELECTRON TUBE CONTROL FOR REVERSIBLE MOTIVE MEANS

Alger S. Riggs, New York, N. Y., assignor to Sperry Gyroscope Company, Inc., Brooklyn, N. Y., a corporation of New York Application September 9, 1933, Serial No. 688,773

14 Claims. (Cl. 172—239)

This invention relates to a means for actuating an electro-magnetic device in either of two directions in accordance with the relative variations in the magnitude of a plurality of electrical quantities, such as signals, by which a single thermionic tube is used in place of the pair of oppositely acting tubes usually employed in such devices. By employing only one tube which alternately passes first one signal or part of a signal and then another, I not only cut in half the number of tubes required for such circuits but also improve the stability which would otherwise be impaired by any changes in the constants of the two opposed tubes.

More especially my invention is adapted to control from a distance a reversible power motor for positioning an object, such as a follow-up system. According to my invention, such a motor may be controlled from A. C. signals which vary in magnitude and direction through a common tube or tubes by means of commutator devices which alternately transfer the signal input to the tube from one side of the incoming signal to the other and a synchronously driven commutating device which simultaneously transfers the output of the tube system to one of two opposed windings to control the direction and torque and speed of the motor.

Referring to the drawings illustrating several forms my invention may assume:—

Fig. 1 is a diagram illustrating the application of my invention as a frequency meter for an A. C. source.

Fig. 2 illustrates the application of my invention for controlling a follow-up reversible power motor from a signal transformer on a gyro compass, for instance.

Fig. 3 is a further development of my invention showing how one system of tubes may be employed to actuate a plurality of reversible motors from a plurality of signals, this system being adapted for the control of follow-up systems about a plurality of axes.

Fig. 4 is a series of diagrams illustrating how the motor is controlled by applicant's phase shifting commutating arrangements.

Referring first to Fig. 1, the A. C. source, the frequency of which is to be measured, is shown at 1 and across said source is placed a variable resistance 2 and a variable condenser or other reactance 3. Between said resistance and condenser I connect one element, say the cathode of the electron tube 4, a biasing battery 5 also being shown in this circuit. Between the grid of said tube and the resistance-condenser circuit is placed a commutating device 6 which alternately connects said grid first to one end and then the other of said resistance-reactance circuit. At the same time the output of said tube is also commutated through a synchronously driven commutator 7 so that said output is connected first to one or the other of opposed windings 8 and 9 in the electro-magnetic device 10. The operation is such that the grid and plate circuits of tube 4 are simultaneously switched between two input voltage drops, i. e., the IR drop across resistance 2 and the $IX_c$ drop across condenser 3, and the two parts or coils in the measuring circuit operating the common armature 12 of the indicator 10. For any given values of resistance 2 and capacity 3 there will be only one frequency where $IR=IX_c$ at which time the pointer on armature 12 will read zero at its central position. By making either the resistance or condenser variable in graduated steps, the frequency can be read directly from the capacity or resistance setting or estimated from the amount of variation of the pointer 12 from the zero position which indicates the normal frequency. By operating the commutators fairly rapidly, the successive impulses will be integrated by the meter so that the pointer will not vibrate appreciably but will indicate the comparative voltages or, in other words, the frequency.

Fig. 2, as stated, shows a follow-up system wherein alternating current signals of variable magnitude and reversible direction or phase position are utilized to control a reversible power motor. Such a system is especially adapted for driving the follow-up systems of gyro compass and in general is shown in the prior application of Francis L. Mosely for Phase shift control for grid-controlled rectifier tubes, Serial No. 679,589, filed July 8, 1933. According to this system a small transformer is used to supply the signal voltages, said transformer having two oppositely wound primaries 13 and 14 connected to one phase of a polyphase supply generator S, and the secondary winding 15 supplying the signal to the step up transformer 16, the output of the winding 15 being controlled in magnitude and direction by varying the magnetic flux through the winding in accordance with the relative position of the controlling and following elements, the windings being preferably on the latter and the separate armature 15' on the former. In order to convert this single voltage into a pair of normally balanced voltages of opposite phase, the balance of which is disturbed in one direction or the other as the sign and magnitude of the single voltage varies, the secondary of the transformer is in effect provided with two opposed windings or center tapped to constitute a voltage dividing coupler and the two ends are connected to the first stage thermionic or vacuum tube 17 through a commutating device 21 which may be similar to commutating device 6 of Fig. 1. Said tube is normally biased to an inoperative condition by means of the resistance net work 18, 19 and 20 across a direct current supply 25.

A resistance 26 and the center tapped resistance 27 across another phase of the supply may be used to furnish a phase biased voltage which is added vectorially to the signal voltage across the secondary of the transformer 16 to produce a voltage of gradually shifting phase and magnitude which is applied to the control grid of the vacuum tube 17. While the magnitude variations are relatively unimportant for applicant's purpose, the phase shift serves to time the operation of the vacuum tube by swinging its grid alternately positive and negative at definite and controllable times in each cycle, somewhat as explained in the aforesaid application of Francis L. Mosely. When positive, tube 17 is rendered conductive, and plate current passes through the resistance 28', causing point 28 to become negative with respect to point 29. This negative drop is communicated to a grid controlled gas filled rectifier tube 30 which may be referred to merely as a grid glow tube through resistances 28' and 20 and serves to bias it to an inoperative position. In like manner, when the grid of tube 17 is made negative its plate current is reduced to zero and hence the grid of tube 30 assumes the potential of point 29 and is thereby rendered conductive for the remainder of the half cycle under consideration. The functioning of the tube 17 and associated circuits in controlling the tube 30 is more fully disclosed and claimed in my prior application Serial No. 668,503, filed April 29, 1933, for Communication systems. By this or other known means, a phase control of the output of the grid glow tube is secured which is responsive to the amplitude and direction of the voltage applied by the signal, the resistances 19 and 20 being chosen to adjust the grid glow tube coupling circuits to an optimum setting.

I also interpose between the output of tube 30 and the control power motor 35 a commutator 22. Commutators 21 and 22 are not only driven together or synchronously but also are preferably driven synchronously with respect to the alternating current voltage supply so that the break points on commutator 22 always occur at zero current. This is represented in the diagram by shaft 40 connecting the generator S and commutator 21 and dotted shaft 40' connecting commutators 21 and 22. Commutator 22, therefore, alternately switches the output of the tube 30 first to one winding 36 and then to the opposed winding 37 of power motor 35. If, therefore, the voltages supplied by the tube are equal at the time each half of the commutator is in engagement with the rotating brush, the motor will stand still, in effect, or rapidly reverse through a small angle, being driven by the bias voltage supplied from potentiometer 27. However, when the voltage so supplied is not equal in the two cases, the motor will run until the balance is restored. Since the two commutators are synchronously driven the winding 36 will always be excited when the segment 23 (for instance) on the commutator 21 is closed and the winding 37 will always be excited when the segment 24 on the commutator 21 is closed. Therefore, the motor is controlled effectively from the signal transformer through a single vacuum and single grid glow tube. Condensers 42 and 43 may be used to smooth out the half wave rectified output of the tube 30, while a resistance 44 may be used to limit the motor current. Transformer 45 coupled to the supply acts to supply the operating voltage to the motor tube circuit.

The operation of the tube circuit in Fig. 2 in controlling the motor may be further explained by reference to the wave form diagrams in Fig. 4. The alternating voltages supplied to the vacuum tube are represented by the sine curve 46 at the top of each diagram A, B and C. The relative size of the shaded portion of each positive half cycle is determined by the phase position of the voltage supplied to the grid of the vacuum tube 17 which controls the time of starting of the grid glow tube 30 in each positive half cycle. The left hand portion of diagram A between dotted lines 47 and 48 represents the operation of the tube during the period of closure of the contact 23, for instance, while the right hand portion between lines 48 and 49 represents the operation between the period of closure of the other contact 24. No signal voltage is being received. The tube at this time is preferably adjusted so that its grid swings sufficiently positive to start the same mid-way in each cycle. Therefore, the motor field 35 is excited to about one half its operating strength and may be represented by the shaded portion 35'. At dotted line 48 both the tube and motor field are thrown over to the opposite contacts, the excitation of the field 37 being represented by the shaded portion 37' which is equal and opposite to 35'. If the commutators are very rapidly operated, the separate excitations of each field are integrated with the assistance of the condensers so that the motor stands still under such circumstances, but preferably the commutators are rotated at moderate speed for gyro compass work so that a tremor or rapid small amplitude hunt is imparted to the follow-up system. This method of imparting the tremor or hunt for gyro compasses possesses many advantages over the prior attempts to secure such a tremor or hunt in electron tube controlled circuits by means of feed back systems of various types. In the present system the frequency of the hunt may be definitely fixed by the rapidity with which the commutator is rotated, while the amplitude may be readily adjusted by adjusting the potentiometers 26 and 27, especially the latter which supplies the bias voltage and, therefore, furnishes the supply for the tube when no signal is passing.

In diagram B the controlling element has moved in a direction to apply signal voltage to the transformer 16 resulting in phase shift of the resultant signal reaching the grid glow tube 30 with a resultant diminution of the output of said tube during the time 47, 48 and in an increase in the output of said tube during the time 48, 49. This results in a weakening of the field current in 35 represented by the shaded portion 35'' and a strengthening of the opposite field represented by the shaded portion 37'' with a consequent driving of the motor in direction to restore synchronization between the sending and following elements.

In diagram C the opposing element has moved in the opposite direction resulting in the opposite movement of the motor for similar reasons.

Fig. 3 shows a still further development of my invention in which the basic circuit of Fig. 2 is applied to follow-up systems operating, for instance, in two planes, such as elevation and azimuth. Such a system may be controlled from a "cruciform" controller, such as shown in the copending application of Bruno A. Wittkuhns and William Anscott, filed September 11, 1931, Serial No. 562,282, the impulses of each part of which art applied to the input transformers 16' and 16". The output of both transformers is in this instance supplied to a single common vacuum tube 17' through a four position commutator 21' which controls the grid of said tube in sequence, first from one side of transformer 16', then from one side of transformer 16", thirdly from the opposite side of transformer 16' and fourthly from the opposite side of transformer 16". The synchronously driven commutator 22' in turn serves to synchronously distribute the output of the grid glow tube 30' to the four windings of the follow-up motors 35₁ and 35₂. In this figure the resistances and other elements operate in substantially the same manner as in Fig. 2 to shift the phase on the grid of the vacuum tube, thereby shifting the phase on the grid glow tube to vary the output thereof in accordance with the respective positions of the controlling elements. Obviously my invention is adapted to control an even greater number of motors or other electro-magnetic devices by further extending the principle of synchronous commutation. It is also obvious that further steps of amplification may be employed if desired either between the signals and tubes and between the two tubes or between the grid glow tube and the electro-magnetic devices.

In accordance with the provisions of the patent statutes, I have herein described the principle and operation of my invention, together with the apparatus which I now consider to represent the best embodiment thereof, but I desired to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. As a means for actuating an electro-magnetic device in one direction or the other from relative variations in the magnitude and sign of oppositely variable signal voltages, the combination with a source of such signal voltages, opposed windings on said device, an electron tube having input and output circuits, means for alternately and rapidly changing the sign of the input signal, and synchronous means for simultaneously switching the output from one to the other of said windings.

2. As a means for actuating a reversible motor from an A. C. controller, the signal of which varies in magnitude and direction, the combination with said controller and reversing means controlling said motor, of a voltage dividing coupler receiving the signal from said controller an electron tube having input and output circuits, means for alternately and rapidly switching the input from one to the other side of said coupler, and synchronous means for simultaneously switching the output from one to the other of said reversing means.

3. As a means for actuating a reversible motor from an A. C. controller, the signal of which varies in magnitude and direction, the combination with opposed windings controller said motor, a voltage dividing coupler receiving the signal from said controller, a single grid glow tube, a continuously driven commutator for switch the output thereof, first to one winding and then to the other, and a synchronously driven commutator for actuating the input, first from one part and then the opposite part of said coupler.

4. In a device for driving an object into positional agreement with a controlling object comprising an inductive device, means operated by the relative positions of said objects for producing an electro-motive force in said inductive device varying in direction and amount in accordance with the relative displacement between said objects, a grid controlled electron tube, a commutating device, a coupling transformer between said means and commutating device to supply alternately opposite phases on the grid of said tube, means for combining each output of said transformer with a substantially fixed voltage having substantial bias for supplying oppositely shifting phases to said grid with respect to its plate, a reversible, motor, and a synchronous commutating device between said motor and tube output for driving said motor in accordance with the integrated preponderance of received impulses.

5. As a means for actuating a reversible electro-motive device in either direction from a pair of opposing controllers through a single grid glow tube, the combination with a common A. C. supply for said device, controllers and tube, and reversing means for said device, of means normally biasing the grid of said tube so that it is inoperative to pass a signal, timing means for placing said grid under the control of first one and then another of said controllers, and synchronous timing means for placing first one and then another of said reversing means in the output circuit of said tube.

6. As a means for actuating a plurality of electro-motive devices in either of two directions from a plurality of two part controllers through a single grid glow tube, the combination with a common A. C. supply for said devices, controllers and tube, reversing windings for each device, means normally biasing the grid of said tube so that it is inoperative to pass a signal, timing means for placing said grid under the control of first one and then another of said controllers and then the other half of each controller in succession, and synchronous timing means for placing first one and then another of said reversing windings of each of said devices in turn in the output circuit of said tube.

7. In a follow-up system for gyro compasses, the combination with a reversible follow-up motor, reversing non-contacting controller and A. C. supply, of an electron tube circuit between said controller and motor, a constantly driven commutator for switching the input to said circuit first to one side and then to the other of said controller, and a synchronously driven commutator for switching the output of said circuit first to one part and then to another part of said motor to operate the same in either direction, said commutators also operating to impart a hunt or tremor to the motor for the purposes specified.

8. In a follow-up system for gyro compasses, the combination with a reversible follow-up motor, reversing non-contacting controller and A. C.

supply, of an electron tube circuit between said controller and motor, a commutator for switching the input to said circuit first to one side and then to the other of said controller, a second commutator for switching the output of said circuit first to one part and then to another part of said motor to operate the same in either direction, and means for operating both commutators in synchronism with each other and the supply and at such a speed as to impart a hunt or tremor to the motor for the purpose specified.

9. As a means for actuating a reversible electromotive device in either direction from a pair of opposing controllers through a single grid glow tube, the combination with a common A. C. supply for said devices, controllers and tube, a multi-element electron tube, and reversing means for said device, of means normally biasing the grid of said electron tube so that it is inoperative to pass a signal, timing means for placing said grid under the control of first one and then another of said controllers, means operable by the output of said electron tube for shifting the phase on the grid of the grid glow tube, and synchronous timing means for placing first one and then another of said reversing means in the output circuit of said glow tube.

10. In a device for driving an object into positional agreement with a controlling object, comprising an inductive device arranged to be supplied with an A. C. signal, in which device the balance between electromotive forces of opposite phase is disturbed in one direction or the other by relative movement of said objects, a grid glow tube having input and output circuits, a commutating device for continuously switching said input first to one terminal and then the other terminal of said device, a reversible motor controlled by the output of said tube, and synchronous means for continuously switching the output of said tube to tend to drive said motor first in one direction and then the other.

11. In a device for driving an object into positional agreement with a controlling object, comprising a two part inductive device in which the balance between electromotive forces of opposite phase is disturbed in one direction or the other by relative movement of said objects, a grid glow tube having input and output circuits, a phase shifting network in said input circuit for shifting the phase on the grid of said tube, a commutating device for continuously switching said input first to one part and then the other of said device, a reversible motor controlled by the output of said tube having two windings, and synchronous means for continuously switching the output of said tube from one to the other of the windings to tend to drive said motor first in one direction and then the other.

12. In a remote positional control, the combination with a reversible two part follow-up motor, reversing non-contacting controller and A. C. supply, of an electron tube between said controller and motor, a constantly driven commutator for switching the output of said tube to cause a magnetic flux in one part of said motor first of one direction and then the other, and for synchronously alternately rendering said tube responsive to potentials of opposite terminals of said controller.

13. In a remote control for a reversible motor, the combination with a controller for producing an A. C. signal of reversible phase, an A. C. supply for said controller, of a grid glow tube having its grid controlled from said signal and its plate circuit for driving said motor, a constantly driven commutating device in said circuit for periodically reversing the connections to a winding of said motor, and for simultaneously rendering said tube responsive to potentials delivered by opposite terminals of said controller.

14. In a remote positional control, in combination with a reversible follow-up motor, a reversible non-contacting controller having an A. C. supply, of an electron tube between said controller and motor, a constantly driven commutator means for switching the output of said tube whereby the connections for said motor are periodically reversed, said commutator means also serving to periodically vary the input connections of said tube from said controller.

ALGER S. RIGGS.